United States Patent [19]

Scott et al.

[11] 4,266,960
[45] May 12, 1981

[54] METHOD AND APPARATUS FOR PRODUCING FIBROUS WOOL PACKS

[75] Inventors: James W. Scott; Robert Rising, both of Newark, Ohio

[73] Assignee: Owens-Corning Fiberglas Corporation, Toledo, Ohio

[21] Appl. No.: 773,890

[22] Filed: Mar. 2, 1977

Related U.S. Application Data

[63] Continuation of Ser. No. 575,870, May 9, 1975, abandoned.

[51] Int. Cl.$^3$ ............................................. C03D 37/04
[52] U.S. Cl. ........................................ 65/4 R; 65/6; 65/9; 156/62.2; 156/62.4; 264/8; 264/12; 264/121
[58] Field of Search .................... 65/4 R, 9, 11 R, 14, 65/15, 16, 6; 156/62.2, 62.4; 264/121, 8, 12; 425/8

[56] References Cited

U.S. PATENT DOCUMENTS

| | | |
|---|---|---|
| 2,732,885 | 1/1956 | Van Der Hoven .................. 65/9 X |
| 2,863,493 | 12/1958 | Snow et al. . |
| 3,020,585 | 2/1962 | Berthon et al. ........................ 65/9 X |
| 3,295,943 | 1/1967 | Mabru ........................................ 65/6 |
| 3,690,852 | 9/1972 | Smith et al. .................... 162/62.4 X |

Primary Examiner—Robert L. Lindsay, Jr.
Attorney, Agent, or Firm—Philip R. Cloutier; Ted C. Gillespie

[57] ABSTRACT

The present invention relates to the manufacture of fibrous wool by the rotary process. In the rotary process heat softenable material, such as molten glass, is supplied to a centrifuge wherefrom streams of said heat softenable material emanate and are acted upon by a fiber attenuating high velocity gaseous medium located about the periphery of the centrifuging means. As a result thereof, a cylindrically shaped veil of high velocity gases having attenuated fibers contained therein flows axially away from the centrifuging means to a suitable collecting means. By the present invention improved method and apparatus are provided for distributing the entrained fibers upon the collecting means. The cylindrically shaped veil is intermittently acted upon by finite planes of high velocity gas thereby interrupting the otherwise columnar flow of the cylincrical veil and establishing diverging flows of fibers. By the intermittent action of the gaseous planes upon the cylindrical veil a randomly uniform distribution of fibers upon the collecting means is realized.

9 Claims, 11 Drawing Figures

METHOD AND APPARATUS FOR PRODUCING FIBROUS WOOL PACKS

This is a continuation of application Ser. No. 575,870, filed May 9, 1975 now abandoned.

BACKGROUND OF THE INVENTION

The present invention relates to method and apparatus for uniformly distributing fibrous glass wool upon a collecting surface. In the manufacture of fibrous wool mats, particularly those used for building insulation, a heat softenable material such as molten glass is supplied to a centrifuging means wherein centrifugal forces cause streams of the molten heat softenable material to emanate from a multiplicity of holes located about the periphery of the centrifuge. These molten streams are then acted upon by an attenuating means located about the periphery of the centrifuge means. Said attenuating means may be a combustion burner, a high velocity blower, or a combination thereof. The molten streams of glass are thus attenuated into fine fibers that can be collected into a mass having a woolly texture.

In addition to attenuating the molten streams into wool fibers, the attenuating means further causes the formation of a cylindrically shaped flow of high velocity gases flowing axially away from the centrifuging means and toward a collecting surface. Entrained within said gaseous veil are the attenuated fibers. Hence, the gaseous veil becomes a conveyance means for distributing the attenuated fibers upon a suitable collecting surface.

Generally the collecting surface upon which the fibrous wool is collected is a moving belt having a surface dimension over which the wool must be distributed greater than that of the cylindrical veil emanating from the fiberizing device. Therefore, it becomes necessary to manipulate the veil to uniformly distribute the entrained fibers over the desired collecting surface dimension.

Many techniques are employed in the prior art to uniformly distribute the fibers over the collecting surface for example: U.S. Pat. No. 3,020,585 issued to Berthon et al. teaches the use of gaseous jets to collapse or flatten the cylindrical veil thereby distributing the entrained fibers over the collecting surface dimension transverse to the surface movement. The major disadvantage of this technique is that it does not permit control of weight distribution over the collecting surface upon which the fibrous wool is distributed.

U.S. Pat. No. 3,295,943 issued to Mabru, teaches that by unsymmetrically varying the ambient pressure surrounding the veil, the veil may be flattened and caused to oscillate transversely across the collecting surface. The ambient pressure is varied by use of a non-attenuating annular blower located about the attenuating means, or by controlling the induced air flow about the veil with movable baffles located about the fiberizing means. The major disadvantage of Mabru's teaching is that as the veil sweeps from one side of the collecting surface to the other, the veil geometrically changes from a flat configuration, with its major dimension parallel to the direction of collecting surface movement, to a cylindrical configuration as it sweeps across the center zone, returning to a flattened configuration as it reaches the opposite side of the collecting surface. Hence, without complex mechanical linkage means, and a highly sophisticated timing mechanism, uniformity of the resulting fiber pack is difficult to control.

U.S. Pat. No. 2,863,493 issued to Snow et al. on the other hand, directs alternating opposed jets of air or steam into impinging engagement with the veil, thereby collapsing the veil and oscillating it transversly across the collecting surface. While Snow produces a uniform distribution of fibers over the collecting surface there is a tendency for lamination and roping of fibers within the pack thereby affecting the structural integrity and thermal efficiency of the product.

SUMMARY OF THE INVENTION

According to the present invention the disadvantages of the prior art are overcome by the action of pulsating planes or sheets of high velocity gas, such as air or steam, directed at the high velocity fiber veil flowing from the fiberizing means. For a given fiber veil two such air planes oppositely disposed, and diametrically staggered are intersectingly directed toward the veil. The planes may intersect a given veil opposing its inherent rotation or complementary to veil rotation.

Upon impingement of the high velocity gaseous planes with the fiber veil, the veil splits into two divergent and oppositely directed fiber flows. The resulting fiber flows may or may not be of equal fiber concentration, depending upon the staggered configuration of the opposing gaseous planes. By pulsating the planes the resulting fiber flows are intermittently created thereby conveying the entrained fiber concentrations to opposite zones of the collecting surface and distributing fibers uniformly across said collecting means.

Further, by vectoring the planes angularly above or below the horizontal it is possible to vary fiber flow throw without changing the intensity or kinetic energy of the gaseous plane. Modulation of the plane pressure pulse from a simple on-off square pressure wave profile to a sinusoidal form has been discovered to improve the lay of fibers upon the collecting surface. Modulation of the square pressure wave to a sinusoidal wave form is accomplished by placement of an accumulator down stream of the on-off regulating means.

Fiber weight distribution across the collecting surface may be controlled by the following: duty ratio (ratio of pulse on time to total cycle time), asymmetrical orientation of the air planes about the cylindrical veil, and vectoring the gaseous planes above or below the horizontal.

PREFERRED EMBODIMENT OF THE INVENTION

Figure 1:
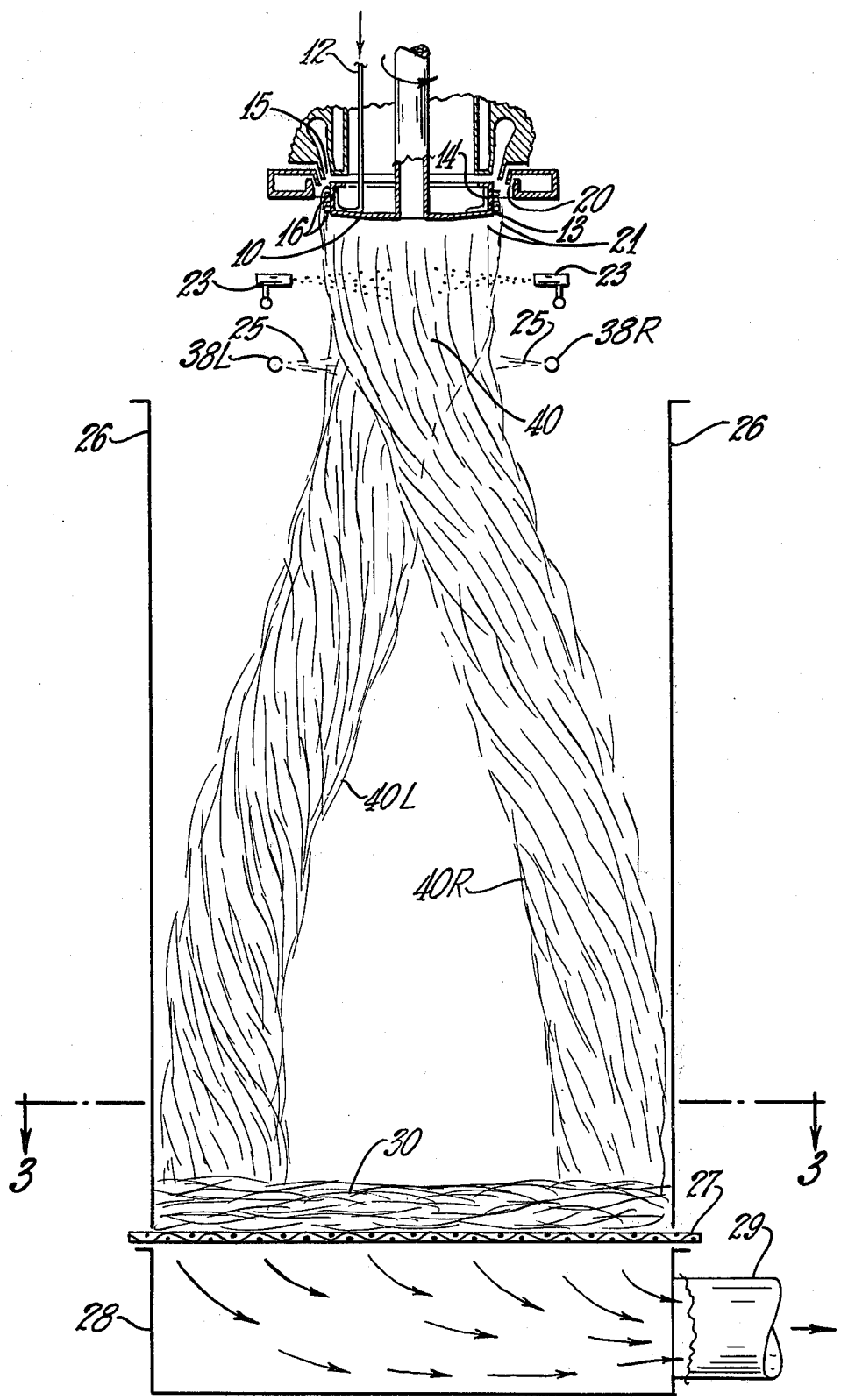
FIG. 1 represents an arrangement of apparatus which may be used to carry out the present invention.

Referring now to the drawings:

FIG. 1 shows a centrifuging rotor 10 rotated by a driving spindle or quill 11. The rotor 10 receives a stream of molten material 12 such as glass which, by the centrifugal forces imparted thereto, is caused to flow out and up the inside of the rotor face 13. Because of the hydrostatic pressure acting upon the molten glass it is forced to flow through a multiplicity of holes 16 drilled into the rotor face 13. The resulting streams of molten glass 14 are acted upon by a blast of high temperature combustion gases exhausting through burner port 15 and directed downward upon the molten glass streams. In addition a jet of high pressure gas or steam is ejected through blower nozzle 20. The combination of high temperature high pressure gases from burner 15 and the high pressure gas ejected from blower 20 acts upon the molten glass streams 14 and attenuates those streams into fibers 21 and directs and accelerates said fibers into a cylindrically shaped veil 40 of high velocity gas with entrained lengths of fibers.

As the fiber veil 40 flows axially away from the fiberizer it may be acted upon by a binder spray or any other known treatment depicted by nozzles 23. Downstream of the fiber veil treatment means 23 are two elongated discharge nozzles 38 through which oppositely directed jets of gas 25, such as air or steam, are directed toward the fiber veil 40. Interaction of jets 25 with the fiber veil 40 re-direct and divide the veil into two separate and distinct fiber flows 40L and 40R. By periodically acting upon veil 40 with jets 25 fiber flows 40L and 40R are intermittently established between end walls 26 thereby distributing fibers over their respective portions of porous collecting means 27. During the time when the jets 25 are off, the veil 40 flows uninterruptedly to the collecting means 27. As a result thereof, a transversely uniform lay of fibers 30 is deposited across the width of chain belt 27. Below the belt 27 is a low pressure plenum chamber 28 through which the forming gases and products of combustion are removed by exhaust conduit 29. The draft created by the low pressure plenum further prevents undesirable floating of the distributed fibers.

Figure 2:
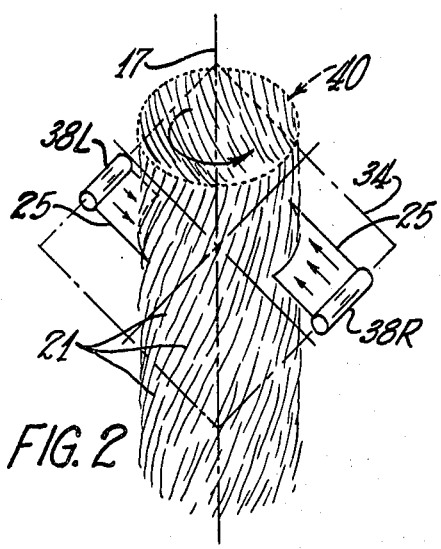
FIG. 2 is a three dimensional schematic representation showing the relationship of the finite gaseous planes and the cylindrical veil.

FIG. 2 is an isometric sketch showing the cylindrical veil 40 inherently rotating in the counter clockwise direction with lengths of attenuated fibers 21 entrained therein. Discharge nozzles 38L and 38R are preferably positioned in plane 34 which intersects veil center line 17 at a right angle. Although the co-planer configuration is preferred it is within the scope of the present invention to locate header 38L and 38R within parallel planes and/or slant said planes angularly with respect to veil center line 17.

Jets 25 emanate from a multiplicity of holes or an elongated slot within header 38 configured so as to create a finite planar sheet-like effluent stream of high velocity gas, which shall be referred to hereinafter as an air knife. Said air knives are directed toward impinging relation with veil 40. The air knives may be co-planar with plane 34 or may be angularly directed above or below plane 34 to control fiber fallout from the respectively created fiber flows.

According to the present invention fiber flows 40L and 40 R are recurrently created by the cyclic action of the air knives 25 upon the fiber veil 40. During the interval of time when the air knives are "on" the fiber flows distribute fibers over their respective collection zones. When the knives are "off" fiber veil 40 flows uninterruptedly towards the center collection zone. Fiber veil 40 when flowing uninterruptedly has a greater fiber concentration than fiber flows 40L and 40R therefore, the time during which veil 40 is permitted to flow uninterruptedly is less than the period during which the fiber flows 40L and 40R exist so that a uniform pack thickness across the collecting surface may be realized. The duty ratio (ratio of knife on to the total cycle) represents the percentage of time during a cycle that the fiber flows 40L and 40R are existent. An acceptable duty ratio for a twelve inch fiberizer producing approximately 1500 pounds of glass fibers per hour has been found to lie within the range of 40 to 85 percent, while an acceptable cycle duration has been found to lie within the range of two seconds maximum to one half second minimum. These parameters are necessarily a function of fiberizer pull rate, desired pack thickness and width of the collecting surface.

Figure 3:
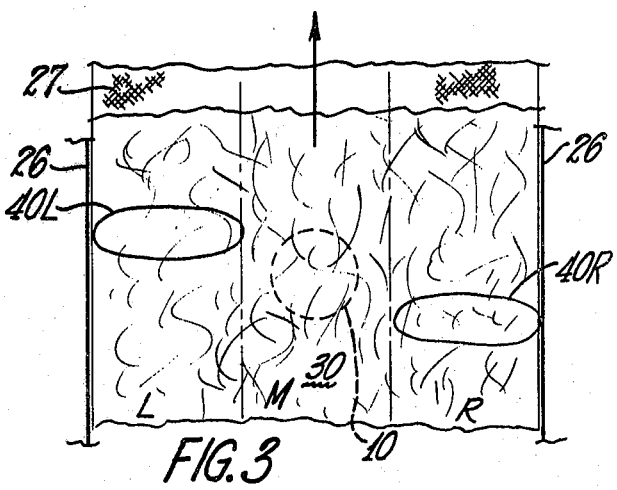
FIG. 3 is a sectional plan view taken along the line 3—3 in FIG. 1 generally showing the fiber flow foot print patterns upon the collecting surface.

FIG. 3 is a sectional plan view taken at 3—3 in FIG. 1. FIG. 3 shows the approximate foot print pattern for fiber flow 40L and 40R when the air knife 25 interacts with the cylindrical veil 40. For orientation purposes the relative position of rotor 10 is shown by broken lines. The collecting surface may be thought of as comprising three weight distribution zones, the left zone L, middle zone M, and right zone R. Generally it may be considered that fiber flow 40L is distributed over zone L and 40 R over zone R when the air knives 25 are on and act upon veil 40. During the null or non-duty portion of the cycle (air knives off) the cylindrical veil 40 flows uninterruptedly toward the collecting surface 27 distributing fibers over the middle zone M. However, by features of the present invention described below each fiber flow may be further controlled assuring uniform distribution of fiber concentrations over their respective zones.

Figure 4:
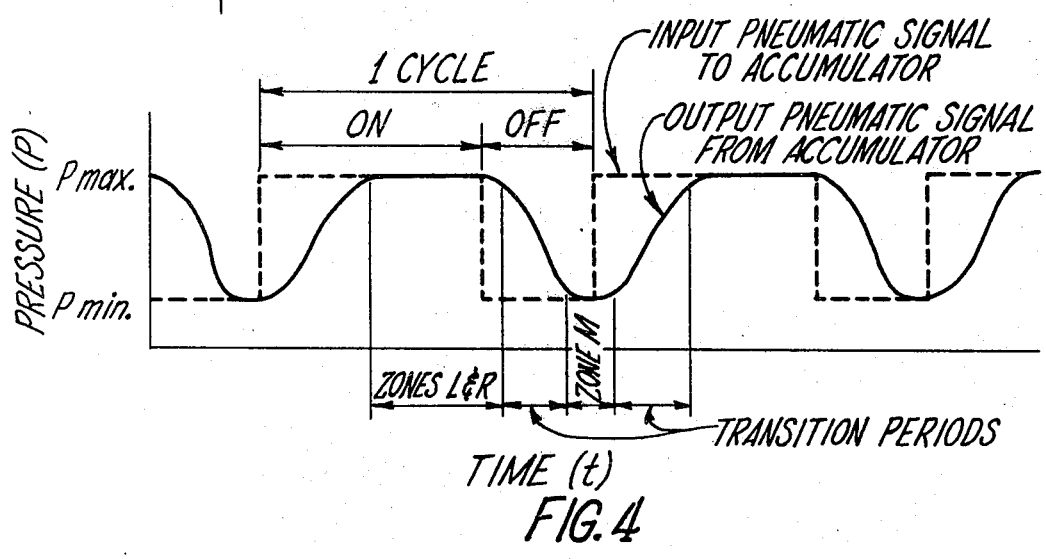
FIG. 4 presents a comparision of the modulated pressure wave form with the square on-off wave form.

According to the present invention the square pressure wave pattern that would otherwise result by activating the air knives by a simple on-off control valve is modulated into a sinusoidal-type wave pattern by placing an accumulator down stream of the on-off control valve. FIG. 4 shows the relationship between the square pressure wave produced by the on-off control valve and the accumulator modified pressure wave pattern which is discharged from the air knife nozzles 38. The modulated pressure wave supplied to air knife nozzle 38 causes the corresponding velocity vectors of the planar air knife 25 to gradually increase from minimum to maximum value and thereafter gradually return to the minimum value. The total cycle period and the on-off portions are shown relative to the square pressure wave. The duty ratio is defined as the "on" time divided by the total period. As illustrated in FIG. 4 the pneumatic pressure output from the accumulator and supplied to the knife nozzles gradually rises to maximum and smoothly decays in a phased relationship with the square on-off input signal. During the time accumulator output is at maximum pressure $P_{max}$, the fiber flows exist and distribute fibers to the left and right collection zones. Conversely, when the accumulator output is $P_{min}$ fibers are distributed to the middle collection zone. Between these two time periods a transition period exists (see FIG. 4) during which the cylindrical veil smoothly diverges into the left and right fiber flows and/or returns to the cylindrical veil configuration. The smooth transition from cylindrical veil to divergent fiber flows and return uniformly distributes fibers across the collection zone boundaries thereby preventing pack discontinuity between these zones.

The pneumatic signal output from the accumulator may be adjusted by varying the size or capacity of the accumulator. Lowering the capacity of the accumulator will cause a more rapid rise and decay of the pneumatic signal while increasing accumulator capacity will have the opposite affect. Thus the interaction of air knife 25 with veil 40 and the character of the resulting fiber flows 40L and 40R becomes a function of total cycle time, duty ratio, pneumatic pressure range, and accumulator capacity. While it has been found preferable for $P_{min}$ to equal zero, it is nevertheless within the scope of the invention for $P_{min}$ to equal some value other than zero. This may be accomplished by appropriate sizing of the accumulator and adjustment of the cycle duration such that the accumulator is not permitted to totally discharge prior to the charging phase of the following cycle.

Figure 5:
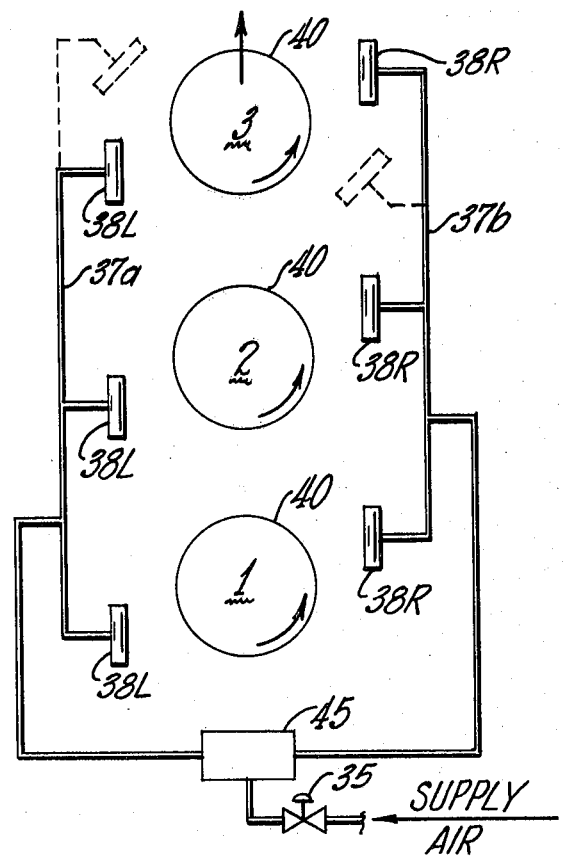
FIG. 5 is a schematic sketch showing an embodiment of the present invention for a multiplicity of fiberizers.

FIG. 5 schematically depicts an embodiment whereby a plurality of fiberizers (not shown) tandem to one another produce counter clockwise rotating fiber veils 40. Positioned about each veil is a pair of opposing air knife nozzles 38L and 38R diametrically staggered about the fiber veils. Supplying the left and right bank of air knife nozzles with pressurized gas is manifold 37a and 37b respectively. Said manifolds are in turn supplied by appropriate conduit means from a common accumulator 45. Controlling the supply of pressurized air to accumulator 45 is on-off control valve 35 which in turn is controlled by any suitable control means (not shown). The fiberizers may also be operated such that each alternating fiber veil rotates in the clockwise direction and opposite to rotation of the veil on either side. Thus one air knife nozzle may be made to service two adjacent fiber veils.

An alternative to the embodiment shown in FIG. 5 is to provide each air knife nozzle with a separate control valve and corresponding downstream accumulator; thus permitting sequential operation of the knives along the row of fiberizers, either against or with the direction of pack travel. For example the air knives may be sequenced in 3, 2, 1 order or 1, 2, 3. The air knives may also be activated in any desired "firing order" thus providing the most random lay of fibers on the collecting belt. For example they may be sequenced 3R, 3L, 2R, 2L, 1R, 1L etc., where R and L denote the right and left nozzle for the numbered fiber veil. Air knife nozzles 38L and 38R may also be angularly orientated with respect to the direction of pack travel as shown by the broken line nozzles positioned about veil 3 in FIG. 5.

Figure 6:
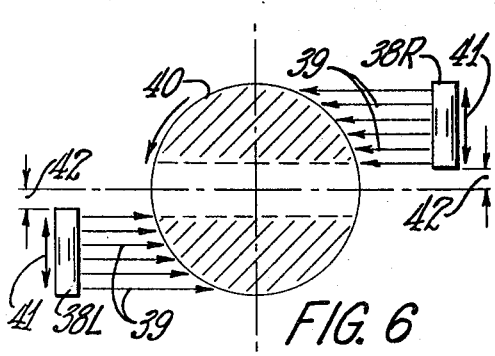
FIGS. 6 through 8 are similar free body diagrams showing various arrangements of apparatus embodying the present invention.

FIG. 6 is a free body diagram showing the physical interaction of the air knives and the cylindrical veil. Opposed nozzles 38L and 38R are diametrically staggered or offset, as indicated by the dimension 42, from a common plane containing the cylindrical veil axial center line. Nozzles 38L and 38R are movable as indicated by arrow 41 providing for adjustment of the offset dimension 42. While it is preferred that both the left and right nozzles be equally offset it may nevertheless be desired to asymmetrically stagger the nozzles for reasons to be discussed below.

The air knives are represented in FIG. 6 by velocity vectors 39. The vectors 39 are shown as having varying lengths only to emphasize the planar character of the jets air knife and illustrate the fact that the vectors interact with the cylindrical fiber veil 40 in a locus of intersecting points about the veil periphery. It is preferred that the velocity throughout the air knife be as uniform as possible. However, it is conceivable that for veil diameters other than twelve inches it may be desirable to establish a velocity gradient within the air knife jet and transverse to the jet direction. The shaded areas of FIG. 6 represent those portions of the veil affected by the air knives. Equal weights of fibers represented by the two shaded areas will be distributed to the left and right distribution zones, while the weight of fibers represented by by the unshaded area will fall through to the middle zone.

Although it is preferred that the direction of the gaseous jet or air knife be complementary to the direction of veil rotation, as shown in FIG. 6, it is nevertheless within the scope of the invention to direct the air knife against the direction of veil rotation. With respect to FIG. 6 this would be equivalent to a clockwise veil rotation. The major disadvantage of directing the air knife against veil rotation is that greater kinetic energy is required within the knife to accomplish the same result as where the air knife acts complementary to veil rotation.

Figure 7:
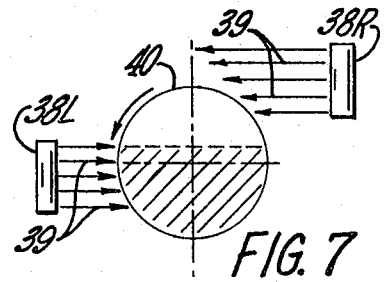
Figure 8:
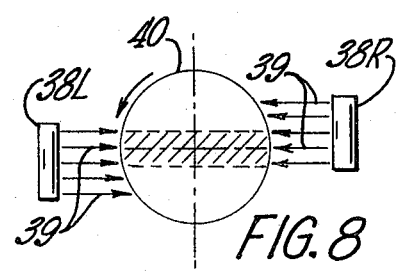

Alternative embodiments of the present invention are illustrated in FIGS. 7 and 8. In FIG. 7 the air knife nozzles are staggered such that nozzle 38L acts upon more than 50 percent of the fiber veil 40. Hence, a greater weight of fibers (represented by the shaded area) will be directed to the right collection zone with a corresponding lesser weight (represented by the unshaded area) directed to the left collection zone. FIG. 8 shows nozzles 38L and 38R overlapping at the axial center line of veil 40. Thus the air knives create an interference area indicated by the shaded area. As a result thereof fibers are distributed to all three zones during the time the air knives are activated. The fibers represented by the top portion of the veil are directed to the left zone by nozzle 38R, those fibers in the shaded or interference area fall through to the middle zone and those contained in the bottom portion of the veil are displaced to the right zone by nozzle 38L.

The fluid mechanics of the present invention is extremely complex and not fully defined or understood. However, it is believed that the fibers being conveyed within veil 40 contain a given kinetic energy and the predominate component comprising their velocity vector is directed axially away from the rotor 10. Hence, the air knife's parallel velocity vectors 39 are added to the fiber velocity vectors resulting in fiber velocity vector of different magnitude and direction; correspondingly the kinetic energy of the fiber is changed. The individual fibers now change their paths of travel in accord with their new energy state. Each individual fiber is believed to be at a uniquely different energy state because of its position within the veil relative to the air knife when acted upon by the knife. The phenomenon is believed to not only divert the cylindrical veil 40 into separate diverging flows 40L and 40R but also because of each fiber's unique energy state result in a truly random orientation of fibers as they alight upon the collecting surface. Alightment of the fibers upon the collecting surface is assisted by the downward draft created by the low pressure plenum 28.

In has been found that uniform glass fiber packs having a total width within the range of 75 to 90 inches are possible employing the concepts of the present invention. In the manufacture of glass fiber building insulation a pack having an approximate width of 78 inches is cut, by appropriate means, into five elongated units each having a nominal width of 15¼ inches. Therefore, for product control purposes the collection surface is divided into five equal transverse widths or lanes. Each lane corresponds to a continuous length of building insulation.

Figure 9:
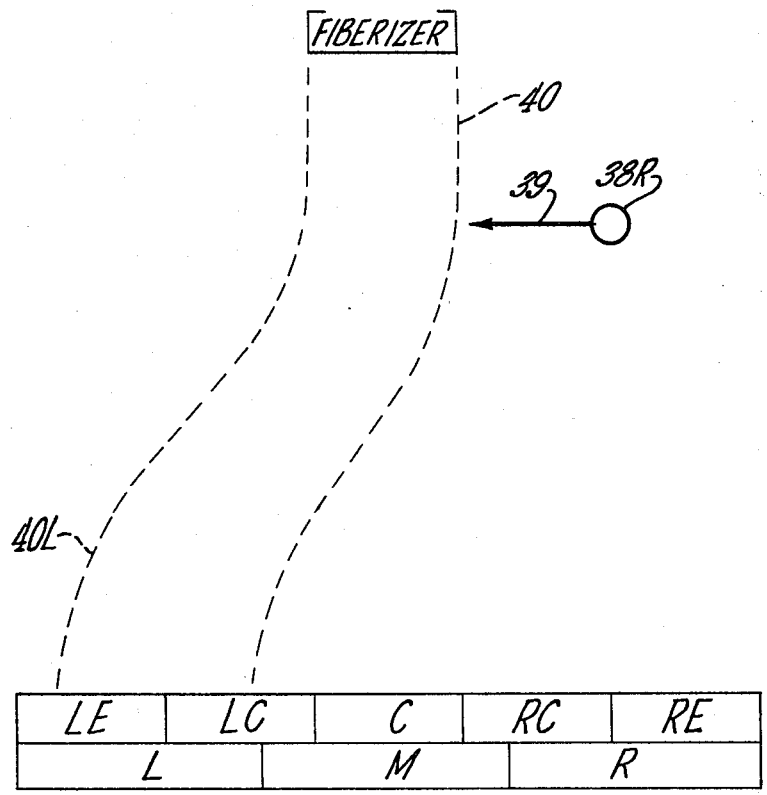
FIGS. 9 through 11 are similar schematic diagrams illustrating means for controlling weight distribution over the collecting surface.
Figure 10:
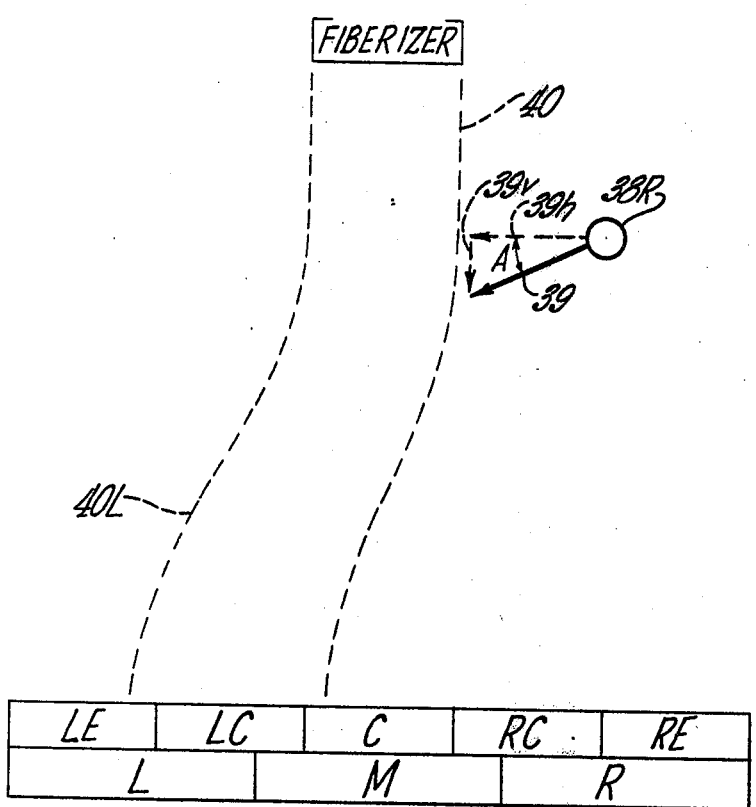
Figure 11:
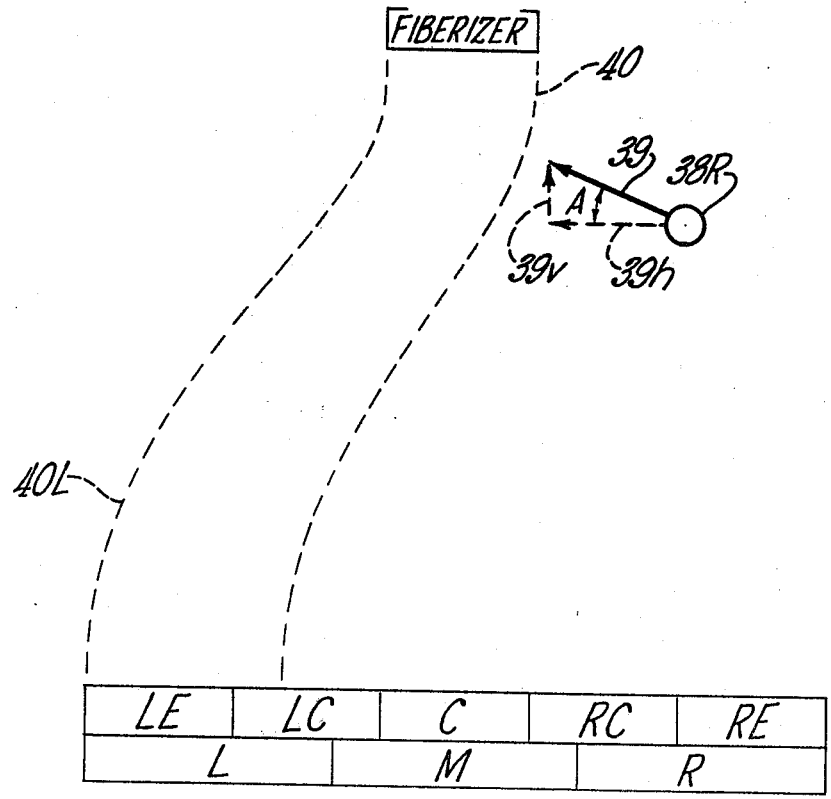

FIGS. 9 through 11 schematically depict a fiberizer producing a downward moving veil 40 being acted upon by air knife nozzle 38R. For purposes of explanation the effects of nozzle 38R only are shown and discussed. However, it is to be understood that the same applies to nozzle 38L and fiber flow 40R. The five product lanes are identified in FIGS. 9 through 11 as C for the center product lane LC and LE for left center and left end product lanes, and RC and RE for right center and right end. For reference purposes the three basic fiber distribution zones L, M. and R are also shown.

FIG. 9 shows the nominal operating configuration of the present invention. The gaseous plane velocity vectors 39 horizontally engage veil 40, generally distributing fiber flow 40L over the left distribution zone L. However, because of possible fiberizer irregularities the weight of fiber distribution required in product lanes LE and LC may be out of specification. FIGS. 10 and 11 depict techniques for adjusting the weight distribution to product lanes LE and LC.

If air knife header 38R is rotated so that the gaseous plane velocity vectors 39 are directed below the horizontal by angle A vector 39 now has a horizontal component 39h and a vertical component 39v. Consequently addition of components 39h and 39v to the fiber velocity vectors shift fiber flow 40L from distribution zone L toward zone M. Therefore, the weight of fibers alighting in product lanes LE, LC and C may be adjusted.

Similarly as shown in FIG. 11 by directing the gaseous plane vectors 39 above the horizontal by angle A an upward or lifting component 39v is added to the fiber vectors tending to float the fibers by decreasing their downward velocity component allowing the fibers to translate further under the influence of vector 39h. The result is that fiber weight may be shifted from lane LC to LE.

For a multiple fiberizer operation as shown in FIG. 5 the left and right rows of nozzles 38 may be rotated as an integral unit or may be individually adjusted to suit the flow conditions of each fiberizer. It should be apparent that rotating nozzle 38R has little if any effect on fiber flow 40R. Therefore the fiber flows 40L and 40R may be independently adjusted.

When combined the means and methods of controlling fiber distribution over the collecting surface described herein present a degree of freedom and flexibility heretofore unknown in the industry.

It is apparent that within the scope of the invention modifications and different arrangements may be made other than as disclosed herein and the present disclosure is illustrative merely, the invention comprehending all variations thereof.

We claim:

1. The method of recovering mineral fibers from a veil of mineral fibers comprising contacting said veil with simultaneously pulsating gaseous blasts from at least two nozzles to divide said veil into at least two principal fiber flows, and recovering said fibers.

2. The method of claim 1 comprising:
 (a) supplying an intermittent on/off signal to a gas supply means which supplies gas to said nozzles; and,
 (b) damping the effect of said gas supply means.

3. The method of claim 2 in which said damping comprises flowing said gas through an accumulator means.

4. The method of claim 1 comprising:
 (a) directing said veil toward a first zone on a collecting surface; and,
 (b) directing said principal fiber flows toward second and third zones of said collecting surface, said first zone being positioned between said second and said third zones.

5. The method of claim 4 comprising:
 (a) supplying an intermittent on/off signal to a gas supply means which supplies gas to said nozzles; and,
 (b) damping the effect of said gas supply means.

6. The method of claim 5 further comprising flowing said gas from said gas supply means through an accumulator means.

7. The method of claim 6 comprising controlling the duty ratio.

8. The method of claim 7 in which said duty ratio is within the range of from about 0.40 to about 0.85.

9. The method of claim 6 in which the total time of each on/off cycle is within the range of from about one-half to about two seconds.

* * * * *